US012606960B2

(12) United States Patent　　　(10) Patent No.:　US 12,606,960 B2
Oishi　　　　　　　　　　　　　　　(45) Date of Patent: 　　　Apr. 21, 2026

(54) STACK-OF-SHEETS PACKAGE

(71) Applicant: TOSHIBA TEC KABUSHIKI KAISHA, Tokyo (JP)

(72) Inventor: Sadatoshi Oishi, Fuji Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 653 days.

(21) Appl. No.: 17/887,518

(22) Filed: Aug. 15, 2022

(65) Prior Publication Data

US 2023/0075859 A1　　　Mar. 9, 2023

(30) Foreign Application Priority Data

Sep. 9, 2021　　(JP) ................................. 2021-146960

(51) Int. Cl.
| | |
|---|---|
| *G06K 19/07* | (2006.01) |
| *B65D 5/20* | (2006.01) |
| *B65H 1/04* | (2006.01) |
| *B65H 1/26* | (2006.01) |
| *B65H 7/04* | (2006.01) |
| *D21H 27/00* | (2006.01) |
| *G06K 19/073* | (2006.01) |

(52) U.S. Cl.
CPC .............. *D21H 27/00* (2013.01); *B65D 5/20* (2013.01); *B65H 1/04* (2013.01); *B65H 1/266* (2013.01); *B65H 7/04* (2013.01); *G06K 19/073* (2013.01); *B65D 2203/10* (2013.01); *B65H 2553/41* (2013.01); *B65H 2553/52* (2013.01); *B65H 2801/06* (2013.01)

(58) Field of Classification Search
CPC ...... B65H 1/266; B65H 1/04; B65H 2553/52; B65H 7/04; B65H 7/02; B65H 43/02; G03G 15/6502; B65D 5/20; B65D 65/22; B65D 2203/11; D21H 27/00; D21H 21/14
See application file for complete search history.

(56) References Cited

U.S. PATENT DOCUMENTS

| | | | |
|---|---|---|---|
| 7,083,083 | B2 | 8/2006 | Droz |
| 7,864,377 | B2 | 1/2011 | Yamada |
| | | (Continued) | |

FOREIGN PATENT DOCUMENTS

| | | |
|---|---|---|
| JP | H05105274 A | 4/1993 |
| JP | 2005228005 A | 8/2005 |
| | (Continued) | |

OTHER PUBLICATIONS

Notice of Reasons for Refusal (Office Action) mailed Apr. 1, 2025 in corresponding Japanese Patent Application No. 2021-146960 with English machine translation, 6 pages.

*Primary Examiner* — Luis A Gonzalez

(74) *Attorney, Agent, or Firm* — Kim & Stewart LLP

(57) ABSTRACT

According to an embodiment, a stack-of-sheets package includes: a stack of sheets; a conductive sheet; and a package material. The stack of sheets is obtained by stacking printing sheets, each of the printing sheets having a printable surface and including a wireless tag. The conductive sheet is disposed at an end portion of the stack of sheets in a stacking direction of the printing sheets. The conductive sheet has a conductive region that overlaps with the wireless tag as viewed from the stacking direction. The package material packages the stack of sheets.

20 Claims, 10 Drawing Sheets

(56)      References Cited

U.S. PATENT DOCUMENTS

| | | | |
|---|---|---|---|
| 8,413,981 B2 * | 4/2013 | Tomono | ............... B41J 13/0081 |
| | | | 271/145 |
| 2006/0254815 A1 * | 11/2006 | Humphrey | ............... H05K 9/00 |
| | | | 174/378 |
| 2010/0213662 A1 | 8/2010 | Tomono | |
| 2023/0138589 A1 * | 5/2023 | Tomiyama | ......... G03G 15/5062 |
| | | | 399/45 |

FOREIGN PATENT DOCUMENTS

| | | | | |
|---|---|---|---|---|
| JP | 2005-313551 | A | | 11/2005 |
| JP | 3119590 | U | | 3/2006 |
| JP | 2006076691 | A | * | 3/2006 |
| JP | 2007-160632 | A | | 6/2007 |
| JP | 2007535063 | A | | 11/2007 |
| JP | 2008037466 | A | | 2/2008 |
| JP | 2008-137787 | A | | 6/2008 |
| JP | 2009126610 | A | | 6/2009 |
| JP | 2010194945 | A | | 9/2010 |

* cited by examiner

STACK-OF-SHEETS PACKAGE

CROSS-REFERENCE TO RELATED APPLICATIONS

This application is based upon and claims the benefit of priority from the prior Japanese Patent Application No. 2021-146960, filed on Sep. 9, 2021, the entire contents of which are incorporated herein by reference.

FIELD

An embodiment to be described here generally relates to a stack-of-sheets package.

BACKGROUND

An image forming apparatus that forms an image on a sheet is used. There is a sheet that includes a wireless tag from/to which information is read/written. Reading/writing is erroneously performed on a sheet that is not a target of reading/writing in some cases. There is a demand for a stack-of-sheets package capable of suppressing erroneous reading/writing.

DETAILED DESCRIPTION

According to an embodiment, a stack-of-sheets package includes: a stack of sheets; a conductive sheet; and a package material. The stack of sheets is obtained by stacking printing sheets, each of the printing sheets having a printable surface, a wireless tag being embedded in each of the printing sheets. The conductive sheet is disposed at an end portion of the stack of sheets in a stacking direction of the printing sheets and has a conductive region that overlaps with the wireless tag as viewed from the stacking direction. The package material packages the stack of sheets.

Figure 1:
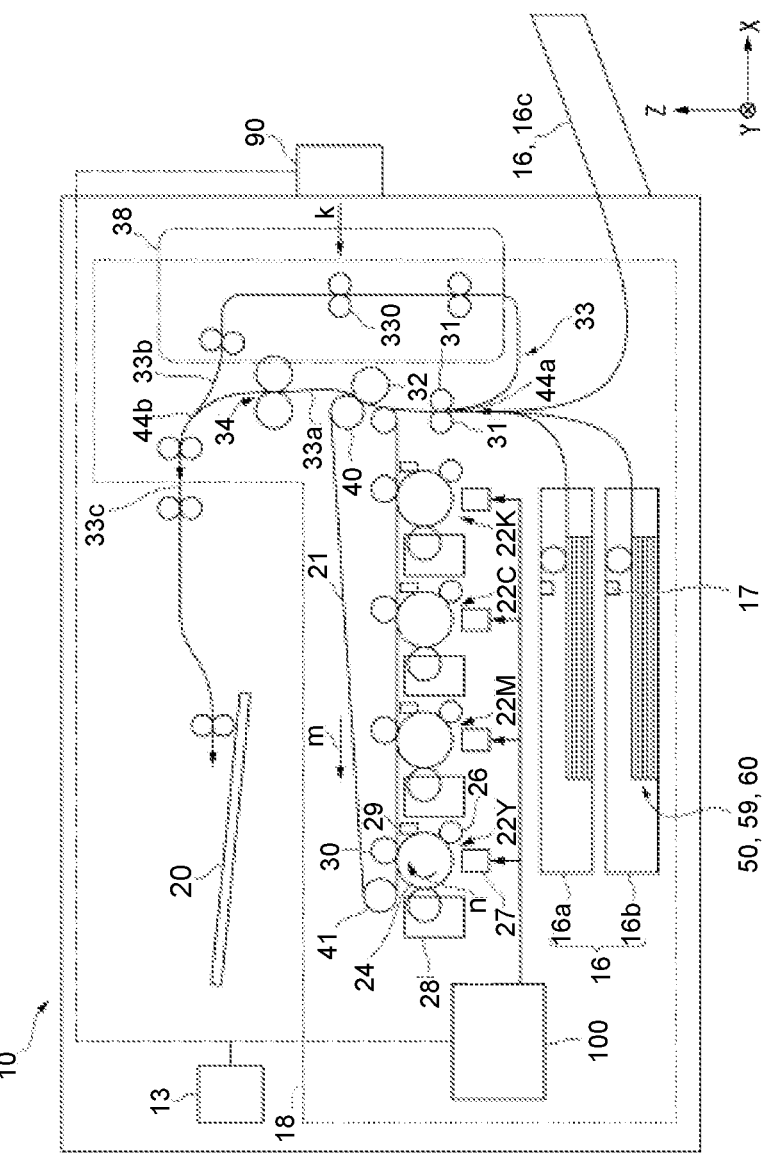
FIG. 1 is a cross-sectional view showing an example of an image forming apparatus according to an embodiment.

Hereinafter, a stack-of-sheets package according to an embodiment will be described with reference to the drawings. In the drawings, the same reference symbols indicate the same or similar portions. First, the configuration of an image forming apparatus 10 according to an embodiment will be described with reference to FIG. 1. FIG. 1 is a cross-sectional view showing an example of the configuration of the image forming apparatus 10.

In FIG. 1, the image forming apparatus 10 includes a control panel 13, a wireless tag communication device 90, and a printer 18. The printer 18 includes a controller 100, paper feed cassettes 16a and 16b, and the like. The controller 100 controls the control panel 13, the wireless tag communication device 90, and the printer 18. The controller 100 controls the conveying of a printing sheet (hereinafter, referred to simply as a sheet) in the printer 18. The control of the conveying of a sheet is to control the convey timing of a sheet, the stop position of a sheet, the convey speed of a sheet, and the like.

The control panel 13 includes an input key and a display device. For example, the input key receives an input by a user. For example, the display device is of a touch panel type. The display device receives an input by a user and performs display for the user. For example, the control panel 13 displays items relating to the operation of the image forming apparatus 10 on the display device such that the items can be set. The control panel 13 notifies (outputs) the controller 100 of the item set by the user.

The paper feed cassettes 16a and 16b each house a sheet that includes a wireless tag. It goes without saying that the paper feed cassettes 16a and 16b are each capable of housing a sheet that includes no wireless tag. In the following description, unless otherwise specified, the sheet represents a sheet that includes a wireless tag. For the sheet, for example, a material such as paper and a plastic film is used.

The printer 18 performs an operation of forming an image. For example, the printer 18 forms an image represented by image data on a sheet. In the following description, forming an image on a sheet will be referred to also as "printing". Note that in this embodiment, the printer 18 is a device that fixes a toner image, but is not limited thereto and may be an inkjet device.

The printer 18 includes an intermediate transfer unit 21. The printer 18 supports the intermediate transfer unit 21 by a driven roller 41, a backup roller 40, and the like. The printer 18 causes the intermediate transfer unit 21 to rotate in a direction indicated by an arrow m. The printer 18 includes a set of four image forming stations 22Y, 22M, 22C, and 22K. The image forming stations 22Y, 22M, 22C, and 22K respectively correspond to Y (yellow), M (magenta), C (cyan), and K (black). The image forming stations 22Y, 22M, 22C, and 22K are disposed below the intermediate transfer unit 21 along the rotation direction of the intermediate transfer unit 21.

Hereinafter, of the image forming stations 22Y, 22M, 22C, and 22K, the image forming station 22Y corresponding to Y (yellow) will be described as an example. Note that since the image forming stations 22M, 22C, and 22K each have the same configuration as that of the image forming station 22Y, detailed description thereof will be omitted.

The image forming station 22Y includes a charging charger 26, an exposure scanning head 27, a developing device 28, and a photoreceptor cleaner 29. The charging charger 26, the exposure scanning head 27, the developing device 28, and the photoreceptor cleaner 29 are disposed around a photoreceptor drum 24 that rotates in a direction indicated by an arrow n.

The image forming station 22Y includes a primary transfer roller 30. The primary transfer roller 30 is disposed to face the photoreceptor drum 24 via the intermediate transfer unit 21.

The charging charger 26 uniformly charges the photoreceptor drum 24. The exposure scanning head 27 exposes the uniformly charged photoreceptor drum 24 to form an electrostatic latent image on the photoreceptor drum 24. The developing device 28 develops the electrostatic latent image on the photoreceptor drum 24 by using a two-component developer including a toner and a carrier to form a toner image on the photoreceptor drum 24.

The primary transfer roller 30 primarily transfers the toner image formed on the photoreceptor drum 24 to the intermediate transfer unit 21. The primary transfer rollers 30 of the image forming stations 22Y, 22M, 22C, and 22K primarily transfer toner images on the intermediate transfer unit 21 to form a color toner image on the intermediate transfer unit 21. The color toner image is a toner image obtained by sequentially superimposing toner images of Y (yellow), M (magenta), C (cyan), and K (black). The photoreceptor cleaner 29 removes the toner remaining on the photoreceptor drum 24 after the primary transfer.

The printer 18 includes a secondary transfer roller 32. The secondary transfer roller 32 is disposed to face the backup roller 40 via the intermediate transfer unit 21. The secondary transfer roller 32 collectively secondarily-transfers the color toner image on the intermediate transfer unit 21 to a sheet. Note that in the following description, the term "toner image" may be one of a color toner image and a toner image of only one color. Further, the toner image may be a toner image using a color fadable toner.

A conveying path 33 is a path through which a sheet is conveyed by a plurality of conveying rollers (e.g., conveying rollers 330). The conveying path 33 includes a first conveying path 33a, a second conveying path 33b, and a third conveying path 33c. The first conveying path 33a is a conveying path from a merging portion 44a to a branch portion 44b. The second conveying path 33b is a conveying path that passes through a double-sided printing device 38 and is a conveying path from the branch portion 44b to the merging portion 44a, which is different from the first conveying path 33a. The third conveying path 33c is a conveying path from the branch portion 44b to a paper ejection tray 20.

The sheet is taken out from a sheet placement portion 16 of one of the paper feed cassette 16a, the paper feed cassette 16b, and a bypass tray 16c. The sheet taken out from the sheet placement portion 16 is temporarily stopped at a portion with which two stopped resist rollers 31 are in contact. At this time, the tip of the sheet is abutted against the resist rollers 31, and the inclination of the sheet is corrected. The controller 100 causes the resist rollers 31 to start rotating in accordance with the position of the toner image of the rotating intermediate transfer unit 21 to move the sheet to the position of the secondary transfer roller 32.

The toner image formed on the intermediate transfer unit 21 is secondarily-transferred to the sheet by the secondary transfer roller 32. Further, the secondarily-transferred toner image is fixed to the sheet by a fixing device 34. In this way, an image is formed on the sheet by the control of the controller 100. The controller 100 conveys, to the third conveying path 33c, the sheet to which the toner image has been fixed by the fixing device 34 and ejects the sheet.

The wireless tag communication device 90 includes an arithmetic device, a storage device, and an antenna (not shown). The wireless tag in this embodiment is, for example, an RFID (Radio Frequency Identifier) tag. The wireless tag communication device 90 transmits, for example, a radio wave in a direction indicated by an arrow k. The wireless tag communication device 90 communicates with the wireless tag of the sheet via the antenna. Specifically, the wireless tag communication device 90 reads information from the wireless tag and writes information to the wireless tag.

Examples of the information to be written to the wireless tag include, in the case where the sheet is used for physical distribution or the like, information indicating the content, information indicating the destination, and the content to be printed on the sheet. In this embodiment, for the wireless tag communication device 90, for example, a radio wave system (UHF) of a 900 MHz band is used. However, the RFID system and frequency band are not limited thereto, and another system and another frequency band can be adopted.

Figure 2:
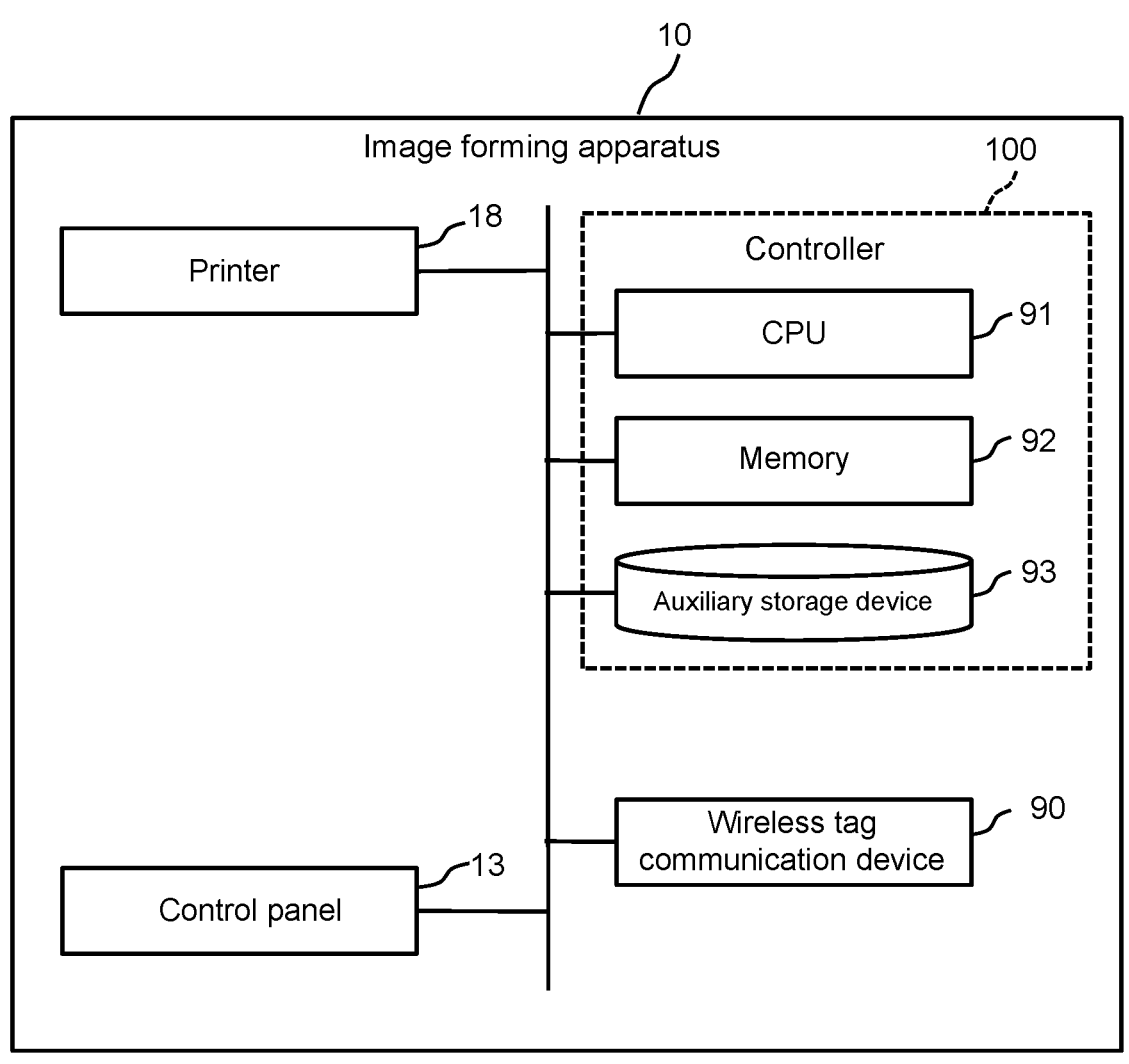
FIG. 2 is a block diagram showing a hardware configuration of the image forming apparatus according to the embodiment.

The controller 100 controls the respective units of the image forming apparatus 10. FIG. 2 is a block diagram showing a hardware configuration of the image processing apparatus. The image forming apparatus 10 includes a CPU (Central Processing Unit) 91, a memory 92, an auxiliary storage device 93, and the like that are connected to each other via a bus and executes a program. The image forming apparatus 10 executes a program to function as an apparatus that includes the printer 18, the control panel 13, and the wireless tag communication device 90.

The CPU 91 executes a program stored in the memory 92 and the auxiliary storage device 93 to function as the controller 100. The controller 100 controls the operation of the respective functional units of the image forming apparatus 10. As the auxiliary storage device 93, a storage device such as a magnetic hard disc device and a semiconductor storage device is used. The auxiliary storage device 93 stores information.

Figure 3:
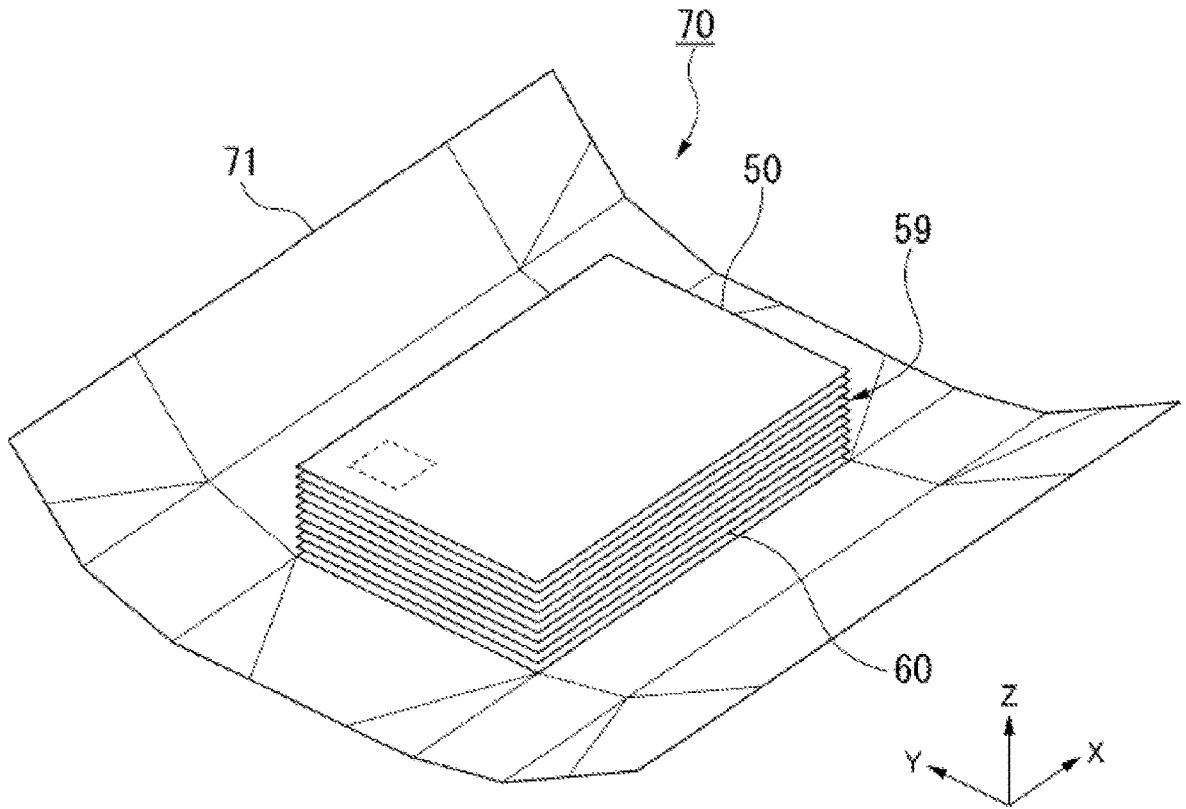
FIG. 3 is a developed view of a stack-of-sheets package according to the embodiment.

A stack-of-sheets package according to the embodiment will be described. FIG. 3 is a developed view of a stack-of-sheets package according to the embodiment. A stack-of-sheets package 70 includes a stack of sheets 59, a conductive sheet 60, and a package material 71.

In this embodiment, Z, X, and Y directions of the Cartesian coordinate system are defined as follows. The Z direction is a stacking direction of sheets 50 (printing sheets) in the stack of sheets 59. The −Z direction is a direction in which the conductive sheet 60 is disposed as viewed from the stack of sheets 59. For example, the Z direction is the vertical direction and the −Z direction is the downward direction. The X direction is the longitudinal direction of the sheet 50 and the Y direction is the lateral direction of the sheet 50. For example, the X direction and the Y direction are horizontal directions.

Figure 4:
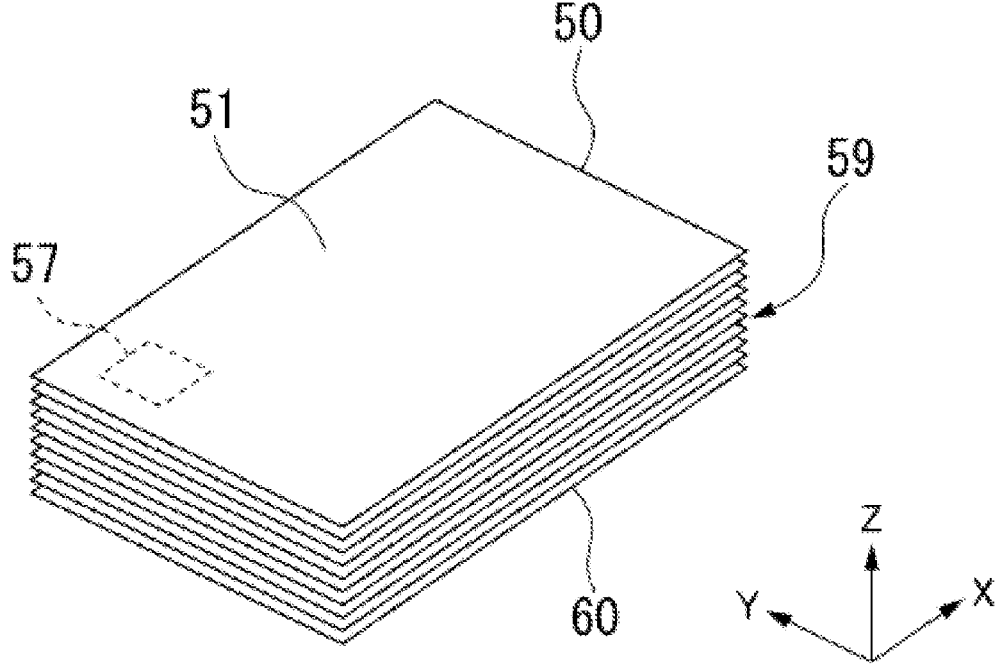
FIG. 4 is a perspective view of a stack of sheets according to the embodiment.

FIG. 4 is a perspective view of the stack of sheets. The stack of sheets 59 includes a plurality of sheets 50 stacked in the Z direction. The sheet 50 is formed of paper, a resin material, or the like. The sheet 50 has a printable surface 51 and includes a wireless tag 57.

The printable surface 51 is the entire surface of the sheet 50. The printable surface 51 may part of the surface of the sheet 50. For example, the printable surface 51 of the sheet 50 is white. The wireless tag 57 of the sheet 50 is embedded inside the sheet 50 in the Z direction (stacking direction of the sheets 50). The wireless tag 57 may be attached to the surface of the sheet 50. The size of the wireless tag 57 is smaller than the sheet 50 in the plane along the X direction and the Y direction (plane perpendicular to the stacking direction). The wireless tag 57 is disposed on part of the sheet 50 as viewed from the Z direction. For example, the wireless tag 57 is an RFID (Radio Frequency Identifier) tag.

The conductive sheet 60 is disposed at an end portion of the stack of sheets 59 in the −Z direction. The "−Z direction" is a direction on the bottom side of the stack of sheets 59. That is, as shown in FIG. 3 or FIG. 4, the conductive sheet 60 is disposed at the bottom portion of the stack of sheets 59.

The size of the conductive sheet 60 in the plane along the X direction and the Y direction (plane perpendicular to the stacking direction) is the same as that of the sheet 50. The size of the conductive sheet 60 may be smaller than that of the sheet 50. The thickness of the conductive sheet 60 in the Z direction may be the same as or different from that of the sheet 50. Details of the conductive sheet 60 will be described below.

Figure 5:
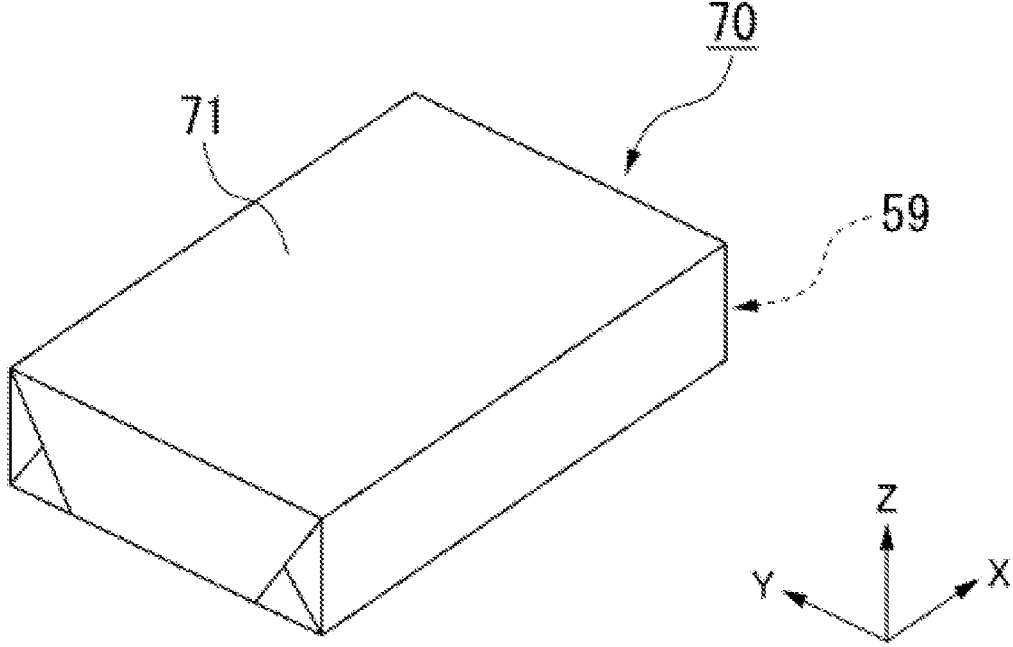
FIG. 5 is a perspective view of the stack-of-sheets package according to the embodiment.

The package material 71 is formed of paper, a resin material, or the like. The package material 71 packages the stack of sheets 59. FIG. 5 is a perspective view showing the stack-of-sheets package. The stack-of-sheets package 70 covers the entire stack of sheets 59 by the package material 71.

As shown in FIG. 3, the package material 71 of the stack-of-sheets package 70 is unfolded and the stack of sheets 59 is taken out. The stack of sheets 59 is taken out while the conductive sheet 60 is disposed at the end portion in the −Z direction. The taken-out stack of sheets 59 is set in the sheet placement portion 16 of the image forming apparatus 10 shown in FIG. 1. The stack of sheets 59 is set while the conductive sheet 60 is disposed on the lower side. A document that guides the setting direction of the conductive sheet 60 may be enclosed inside the package material 71.

Figure 6:
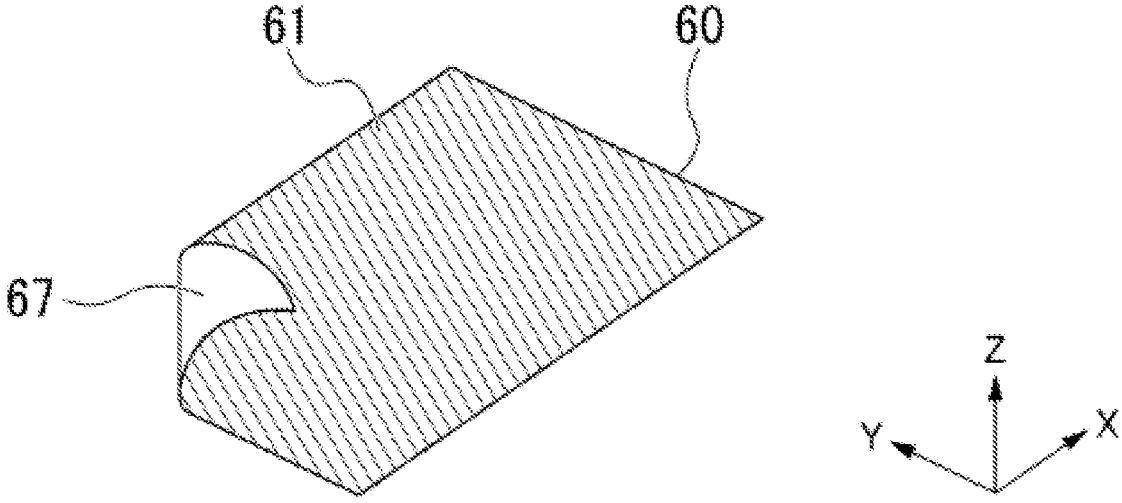
FIG. 6 is a perspective view of a conductive sheet according to the embodiment.

The conductive sheet 60 will be described in detail. FIG. 6 is a perspective view showing the conductive sheet 60. The base material of the conductive sheet 60 is formed of paper, a resin material, or the like. The conductive sheet 60 has a conductive region 67 formed of a conductive material. For example, the conductive material is a metal material such as aluminum. The conductive region 67 overlaps with the wireless tag 57 of the sheet 50 as viewed from the Z direction. In the example of FIG. 6, the surface of the conductive sheet 60 in the −Z direction is the conductive region 67. That is, the conductive region 67 is formed on the entire surface opposite to the surface (having a light reflectance adjusting region 61 described below) in contact with the sheet at the bottom of the stack of sheets 59. For example, the conductive region 67 is formed by vapor deposition of aluminum on the base material of the conductive sheet 60. The base material of the conductive sheet 60 may be formed of a conductive material.

The sheet to be read/written by the wireless tag communication device 90 in FIG. 1 is a sheet moving along the conveying path 33. The sheet 50 set in the sheet placement portion 16 is not a target for reading/writing of the wireless tag communication device 90. In the case where there is a plurality of sheets 50 in the sheet placement portion 16, the wireless tags 57 of the sheets 50 overlap with each other in the Z direction. The impedance of the antenna of the wireless tag 57 is reduced, the matching with the chip is broken, and the communication between the wireless tag 57 and the wireless tag communication device 90 becomes difficult. As a result, erroneous reading/writing of the plurality of the sheets 50 disposed on the sheet placement portion 16 is suppressed.

In the case where he sheets 50 on the sheet placement portion 16 are used for printing and the number of the remaining sheets 50 is one, the wireless tags 57 do not overlap with each other in the Z direction. It is necessary to suppress erroneous reading/writing of the remaining sheet 50. The conductive sheet 60 in FIG. 6 is disposed on the lower side of the stack of sheets 59. The conductive sheet 60 is present below the remaining sheet 50. The conductive region 67 of the conductive sheet 60 overlaps with the wireless tag 57 of the sheet 50 as viewed from the Z direction. The impedance of the antenna of the wireless tag 57 is reduced and the communication between the wireless tag 57 and the wireless tag communication device 90 becomes difficult. Therefore, erroneous reading/writing of the remaining sheet 50 on the sheet placement portion 16 is suppressed.

The entire surface of the conductive sheet 60 in the −Z direction is the conductive region 67. The sheets 50 set in the sheet placement portion 16 in FIG. 1 are conveyed in the +X direction. The overlap between the wireless tag 57 and the conductive region 67 continues until the wireless tag 57 reaches the end portion of the conductive sheet 60 in the +X direction. As a result, erroneous reading/writing of the sheets 50 is suppressed.

The sheet placement portion 16 in FIG. 1 includes a sheet detection device 17 that detects the presence/absence of the sheet 50. For example, the sheet detection device 17 includes an optical sensor. The optical sensor of the sheet detection device 17 applies light to the detection position of the sheet 50 and receives reflected light. The detection position is part of the printable surface 51 of the sheet 50. In the case where the printable surface 51 of the sheet 50 is a bright color such as white, the light reflectance is large and thus, the reflected light is strong. In the absence of the sheet 50, the reflected light is weak. The optical sensor of the sheet detection device 17 detects the presence/absence of the sheet 50 on the basis of the intensity of the reflected light.

The conductive sheet 60 in FIG. 6 has the light reflectance adjusting region 61 having light reflectance different from that of the printable surface 51 of the sheet 50. For example, in the case where the printable surface 51 is a bright color such as white, the light reflectance adjusting region 61 is a dark color such as black. In this case, the light reflectance of the light reflectance adjusting region 61 is smaller than that of the printable surface 51. On the contrary, in the case where the printable surface 51 is a dark color, the light reflectance adjusting region 61 is a bright color. In this case, the light reflectance of the light reflectance adjusting region 61 is larger than that of the printable surface 51. The light reflectance adjusting region 61 may be formed of a material having light reflectance different from that of the printable surface 51. The light reflectance adjusting region 61 overlaps with the detection position of the sheet 50 by the optical sensor of the sheet detection device 17 as viewed from the Z direction. In the example shown in FIG. 6, the entire surface of the conductive sheet 60 in the +Z direction is the light reflectance adjusting region 61.

In the case where the sheet 50 is not present on the sheet placement portion 16 in FIG. 1, the optical sensor of the sheet detection device 17 applies light to the light reflectance adjusting region 61 of the conductive sheet 60. The intensity of the reflected light from the light reflectance adjusting region 61 is different from the intensity of the reflected light from the printable surface 51. As a result, the absence of the sheet 50 is detected.

In the case where the absence of the sheet 50 is detected, the controller 100 in FIG. 1 displays, on the control panel 13, that the sheet 50 is not present. The controller 100 stops a print job. The conductive sheet 60 remains on the sheet placement portion 16. A user of the image forming apparatus 10 takes out the conductive sheet 60 from the sheet placement portion 16 and discards the taken-out conductive sheet 60. It may be indicated on the surface of the conductive sheet 60 in the +Z direction that the conductive sheet 60 should be discarded. The user sets a new stack of sheets 59 and a new conductive sheet 60 in the sheet placement portion 16 and restarts the print job. The taken-out old conductive sheet 60 may be reused. The user may set a new stack of sheets 59 and a new conductive sheet 60 on the conductive sheet 60 remaining on the sheet placement portion 16.

As described in detail above, the stack-of-sheets package 70 according to the embodiment includes the stack of sheets 59, the conductive sheet 60, and the package material 71. The stack of sheets 59 is obtained by stacking the sheets 50, each of the sheets 50 having the printable surface 51 and including the wireless tag 57. The conductive sheet 60 is disposed at an end portion of the stack of sheets 59 in the Z direction. The conductive sheet 60 has the conductive region 67 that overlaps with the wireless tag 57 as viewed from the Z direction. The package material 71 packages the stack of sheets 59.

The conductive sheet 60 is present in the −Z direction of the stack of sheets 59. The conductive region 67 of the conductive sheet 60 overlaps with the wireless tag 57 of the sheet 50 as viewed from the Z direction. The communication between the wireless tag 57 and the wireless tag communication device 90 becomes difficult. Therefore, erroneous reading/writing of the sheets 50 is suppressed.

The conductive sheet 60 has the light reflectance adjusting region 61. The light reflectance adjusting region 61 overlaps with the detection position of the sheet 50 by the optical sensor of the sheet detection device 17 as viewed from the Z direction. The light reflectance of the light reflectance adjusting region 61 is different from that of the printable surface 51.

In the absence of the sheet 50, the optical sensor of the sheet detection device 17 applies light to the light reflectance adjusting region 61 of the conductive sheet 60. The intensity of the reflected light from the light reflectance adjusting region 61 is different from the strength of the reflected light from the printable surface 51. As a result, the absence of the sheet 50 is detected.

In the example shown in FIG. 6, the entire surface of the conductive sheet 60 in the −Z direction is the conductive region 67 and the entire surface in the +Z direction is the light reflectance adjusting region 61. Meanwhile, the entire surface in the +Z direction may be both the conductive region 67 and the light reflectance adjusting region 61.

Figure 7:
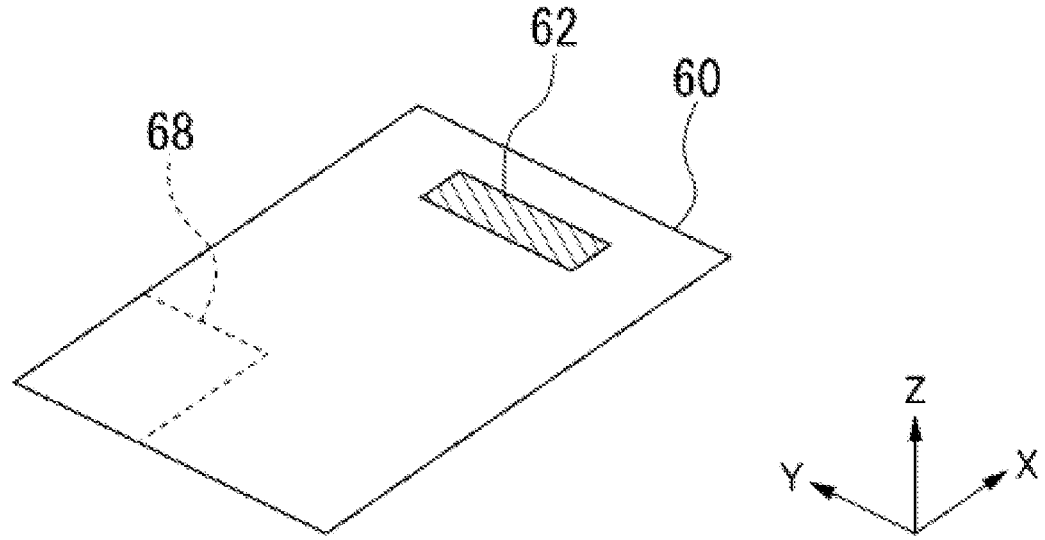
FIG. 7 is a perspective view of a conductive sheet according to a first modification of the embodiment.

A conductive sheet according to a first modification will be described. FIG. 7 is a perspective view showing the conductive sheet according to the first modification. The description of the first modification in portions similar to those in the above-mentioned embodiment is omitted in some cases.

The conductive sheet 60 according to the first embodiment has a conductive region 68. The conductive region 68 overlaps with the wireless tag 57 of the sheet 50 as viewed from the Z direction. In the first modification, only part of the surface of the conductive sheet 60 in the −Z direction is the conductive region 68. Only part of the surface of the conductive sheet 60 in the +Z direction may be the conductive region 68. Even with the conductive sheet 60 according to the first modification, erroneous reading/writing of the sheets 50 set in the sheet placement portion 16 is suppressed similarly to the embodiment.

The conductive sheet 60 according to the first modification has a light reflectance adjusting region 62. The light reflectance adjusting region 62 overlaps with the detection position of the sheet by the optical sensor of the sheet detection device 17 as viewed from the Z direction. In the first modification, only part of the surface of the conductive sheet 60 in the +Z direction is the light reflectance adjusting region 62. Even with the conductive sheet 60 according to the first modification, the absence of the sheet 50 in the sheet placement portion 16 is detected similarly to the embodiment.

Figure 8:
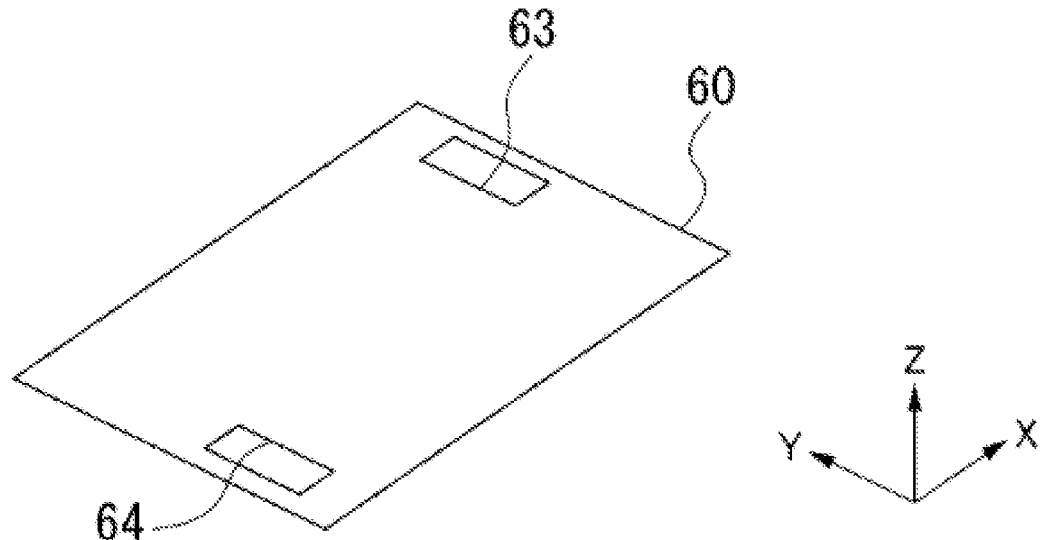
FIG. 8 is a perspective view of a conductive sheet according to a second modification of the embodiment.

A conductive sheet according to a second modification will be described. FIG. 8 is a perspective view showing the conductive sheet according to the second modification. The description of the second modification in portions similar to those in the above-mentioned embodiment is omitted in some cases.

The sheet placement portion 16 in FIG. 1 includes the sheet detection device 17 that detects the presence/absence of the sheet 50. For example, the sheet detection device 17 includes a physical switch. The physical switch of the sheet detection device 17 is in contact with the detection position of the sheet 50. In the case where the sheet 50 is present on the sheet placement portion 16, the physical switch of the sheet detection device 17 stops at the surface of the sheet 50. In the absence of the sheet 50, the physical switch of the sheet detection device 17 largely moves in the −Z direction. The physical switch of the sheet detection device 17 detects the presence/absence of the sheet 50 on the basis of the movement amount in the Z direction.

The conductive sheet 60 according to the second modification shown in FIG. 8 includes a first hole 63 used for detecting the absence of the sheet 50. The first hole 63 penetrates the conductive sheet 60 in the Z direction. The first hole 63 overlaps with the detection position of the sheet 50 by the physical switch of the sheet detection device 17 as viewed from the Z direction. In the case where the sheet 50 is not present on the sheet placement portion 16, the physical switch of the sheet detection device 17 passes through the first hole 63 of the conductive sheet 60 and largely moves in the −Z direction. As a result, the absence of the sheet 50 in the sheet placement portion 16 is detected.

The detection position of the sheet 50 by the physical switch of the sheet detection device 17 is set to a position away from the center point of the sheet in the X direction and the Y direction in some cases. The conductive sheet 60 is set in the opposite direction of the X direction and the Y direction with respect to the sheet placement portion 16 in FIG. 1 in some cases. In this case, the detection position of the sheet 50 and the position of the first hole 63 of the conductive sheet 60 do not overlap with each other as viewed from the Z direction.

The conductive sheet 60 according to the second modification includes a second hole 64. The first hole 63 and the second hole 64 are located at points symmetrical with respect to the center point of the conductive sheet 60 in the X direction and the Y direction. In the case where the conductive sheet 60 is set in the opposite direction of the X direction and the Y direction, the physical switch of the sheet detection device 17 passes through the second hole 64 and largely moves in the −Z direction. As a result, the absence of the sheet 50 in the sheet placement portion 16 is detected.

The conductive sheet 60 according to the second modification includes the first hole 63 at the detection position of the sheet 50 by the physical switch of the sheet detection device 17. Meanwhile, the conductive sheet 60 may include the first hole 63 at the detection position of the sheet by the optical sensor of the sheet detection device 17. In the case where the sheet 50 is not present on the conductive sheet 60, the optical sensor of the sheet detection device 17 applies light to the first hole 63 of the conductive sheet 60. The sheet placement portion 16 under the conductive sheet 60 reflects the light. The reflected light from the sheet placement portion 16 is weaker than the reflected light from the printable surface 51 of the sheet 50. As a result, the absence of the sheet 50 in the sheet placement portion 16 is detected.

Figure 9:
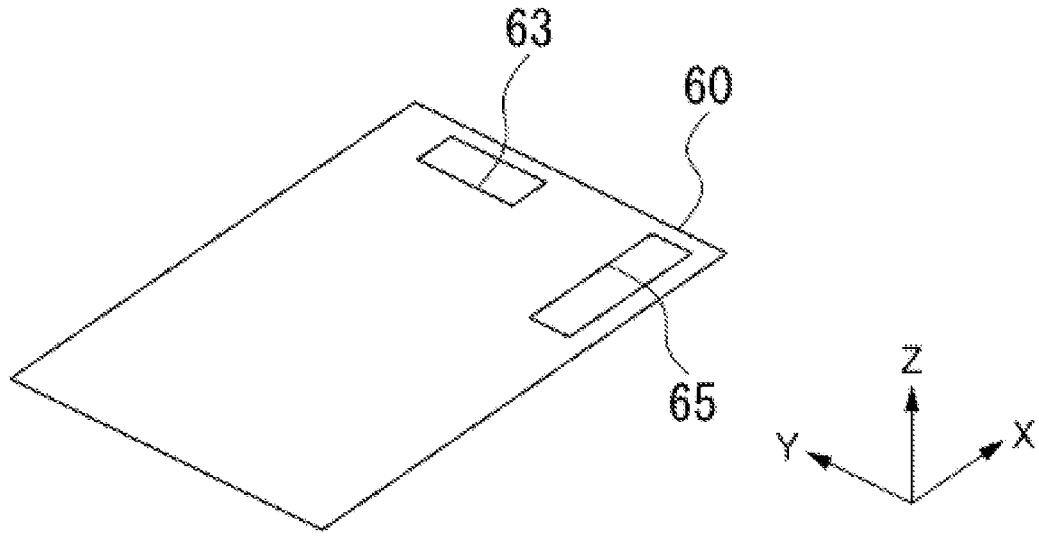
FIG. 9 is a perspective view of a conductive sheet according to a third modification of the embodiment.

A conductive sheet according to a third modification will be described. FIG. 9 is a perspective view showing the conducive sheet according to the third modification. The description of the third modification in portions similar to those in the above-mentioned embodiment is omitted in some cases.

The detection position of the sheet 50 by the physical switch of the sheet detection device 17 differs depending on the manufacturer of the image forming apparatus 10 in some cases. The first hole 63 of the conductive sheet 60 is disposed corresponding to the detection position of the sheet 50 in the image forming apparatus 10 manufactured by a first company in some cases. When this conductive sheet 60 is set in the sheet placement portion 16 of the image forming apparatus 10 manufactured by a second company, the physical switch of the sheet detection device 17 stops at the surface of the conductive sheet 60. In this case, the absence of the sheet 50 in the sheet placement portion 16 cannot be detected.

The conductive sheet 60 according to the third modification includes a third hole 65. The third hole 65 is disposed corresponding to the detection position of the sheet 50 in the image forming apparatus 10 manufactured by the second company. When this conductive sheet 60 is set in the sheet placement portion 16 of the image forming apparatus 10 manufactured by the second company, the physical switch of the sheet detection device 17 passes through the third hole 65 and largely moves in the −Z direction. The absence of the sheet 50 in the sheet placement portion 16 is detected not only in the image forming apparatus 10 manufactured by the first company but also in the image forming apparatus 10 manufactured by the second company.

Figure 10:
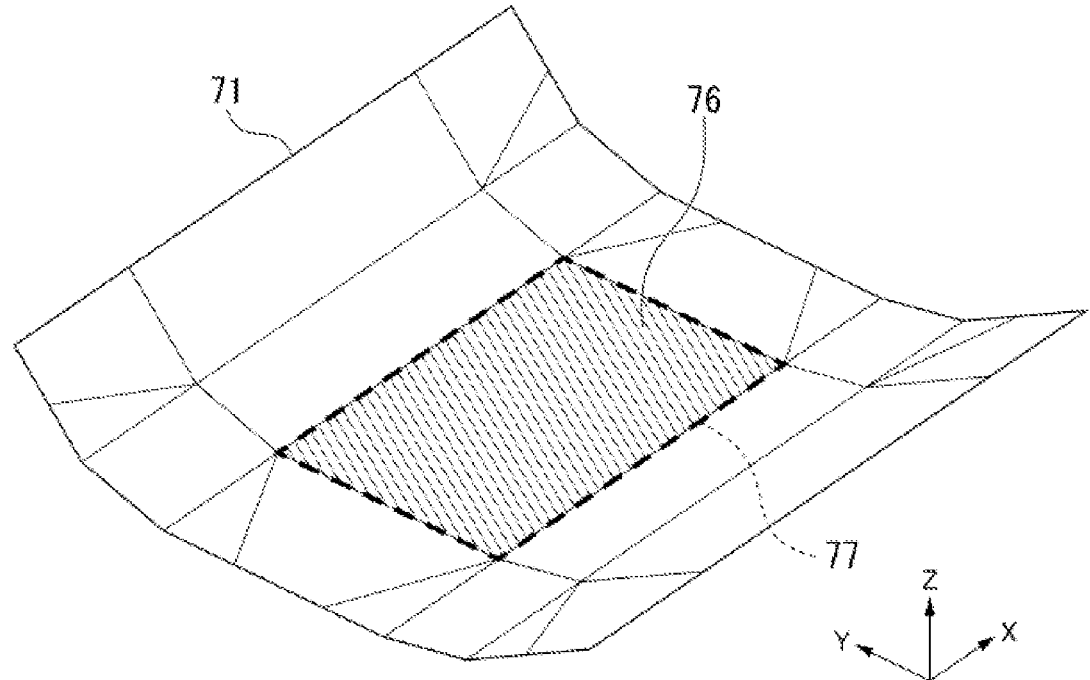
FIG. 10 is a perspective view of a package material according to a fourth modification of the embodiment.

A conductive sheet according to a fourth modification will be described. FIG. 10 is a perspective view showing a package material according to the fourth modification. The description of the fourth modification in portions similar to those in the above-mentioned embodiment is omitted in some cases.

A conductive sheet 76 according to the fourth modification is part of the package material 71. The conductive sheet 76 is formed in a region of the package material 71 that comes in contact with the surface of the stack of sheets 59 in the −Z direction. For example, the conductive sheet 76 is similar to the conductive sheet 60 according to the embodiment shown in FIG. 6. The entire surface of the conductive sheet 76 in the −Z direction is a conductive region and the entire surface in the +Z direction is a light reflectance adjusting region. The conductive region and the light reflectance adjusting region may be formed on the entire package material 71.

Since the conductive sheet 76 is part of the package material 71, it is unnecessary to prepare a conductive sheet separately from the package material 71. Even in the case where the sheets 50 of various sizes are present, it is unnecessary to prepare a conductive sheet in accordance with the size of the sheet 50. Therefore, the cost of the stack-of-sheets package 70 is reduced.

The package material 71 has a notch 77 in part of the surroundings of the conductive sheet 76. The conductive sheet 76 is separated from the package material 71 at the region where the notch 77 is formed and is connected to the package material 71 at the region where the notch 77 is not formed. When a user separates the region where the notch 77 is not formed, the conductive sheet 76 is completely separated from the package material 71. The stack of sheets 59 and the conductive sheet 76 are taken out from the package material 71 while they are overlapped with each other. By providing the notch 77 in part of the surroundings of the conductive sheet 76, it is easy to take out the conductive sheet 76.

According to at least one embodiment described above, the conductive sheet 60 is provided at an end portion of the stack of sheets 59 in the −Z direction. As a result, it is possible to suppress erroneous reading/writing of the sheets 50.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stack-of-sheets package, comprising:
   a stack of sheets obtained by stacking printing sheets, each of the printing sheets having a printable surface, a wireless tag being embedded in each of the printing sheets;
   a conductive sheet that is disposed at an end portion of the stack of sheets in a stacking direction of the printing sheets and has a conductive region that overlaps with the wireless tag as viewed from the stacking direction, the conductive sheet having a same sheet size as the printing sheets; and
   a package material that packages the stack of sheets, wherein the package material is a folded sheet enclosing the stack of sheets.

2. The stack-of-sheets package according to claim 1, wherein
   the conductive region is formed on an entire surface of the conductive sheet opposite to a surface that is in contact with the printing sheet at a bottom of the stack of sheets.

3. The stack-of-sheets package according to claim 1, wherein
   the conductive region is formed on part of a surface of the conductive sheet opposite to a surface that is in contact with the printing sheet at a bottom of the stack of sheets.

4. The stack-of-sheets package according to claim 1, wherein
   the stack of sheets and the conductive sheet are housed in an image forming apparatus that forms an image on the printing sheet, and
   the conductive sheet includes a hole to be used for detecting absence of the printing sheet by the image forming apparatus.

5. The stack-of-sheets package according to claim 1, wherein
   the stack of sheets and the conductive sheet are housed in an image forming apparatus that forms an image on the printing sheet, and
   the conductive sheet includes a first hole to be used for detecting absence of the printing sheet by the image forming apparatus and a second hole to be used for detecting absence of the printing sheet, the second hole being formed at a position symmetrical with the first hole with respect to a center point of the conductive sheet.

6. The stack-of-sheets package according to claim 1, wherein the stack of sheets and the conductive sheet are housed in an image forming apparatus that forms an image on the printing sheet, the image forming apparatus includes an optical sensor for detecting absence of the printing sheet, and the conductive sheet has a region having light reflectance different from that of the printable surface, the region overlapping with the detection position of the printing sheet by the optical sensor as viewed from the stacking direction.

7. The stack-of-sheets package according to claim 6, wherein the conductive sheet has the region having light reflectance different from that of the printable surface on an entire surface opposite to the surface on which the conductive region is provided.

8. The stack-of-sheets package according to claim 6, wherein the conductive sheet has the region having light reflectance different from that of the printable surface on part of a surface opposite to the surface on which the conductive region is provided.

9. The stack-of-sheets package according to claim 1, wherein the conductive sheet is part of the package material.

10. The stack-of-sheets package according to claim 9, wherein the package material includes a notch in part of surroundings of the conductive sheet.

11. A stack-of-sheets package, comprising:

a stack of sheets obtained by stacking printing sheets, each of the printing sheets having a printable surface, a wireless tag being embedded in each of the printing sheets;

a conductive sheet that is disposed at an end portion of the stack of sheets in a stacking direction of the printing sheets and has a conductive region that overlaps with the wireless tag as viewed from the stacking direction, the conductive region being formed on part of a surface of the conductive sheet opposite to a surface that is in contact with the printing sheet at a bottom of the stack of sheets; and a package material that packages the stack of sheets.

12. The stack-of-sheets package according to claim 11, wherein the stack of sheets and the conductive sheet are housed in an image forming apparatus that forms an image on the printing sheet, and the conductive sheet includes a hole to be used for detecting absence of the printing sheet by the image forming apparatus.

13. The stack-of-sheets package according to claim 11, wherein the stack of sheets and the conductive sheet are housed in an image forming apparatus that forms an image on the printing sheet, and the conductive sheet includes a first hole to be used for detecting absence of the printing sheet by the image forming apparatus and a second hole to be used for detecting absence of the printing sheet, the second hole being formed at a position symmetrical with the first hole with respect to a center point of the conductive sheet.

14. The stack-of-sheets package according to claim 11, wherein the stack of sheets and the conductive sheet are housed in an image forming apparatus that forms an image on the printing sheet, the image forming apparatus includes an optical sensor for detecting absence of the printing sheet, and the conductive sheet has a region having light reflectance different from that of the printable surface, the region overlapping with the detection position of the printing sheet by the optical sensor as viewed from the stacking direction.

15. The stack-of-sheets package according to claim 14, wherein the conductive sheet has the region having light reflectance different from that of the printable surface on an entire surface opposite to the surface on which the conductive region is provided.

16. The stack-of-sheets package according to claim 14, wherein the conductive sheet has the region having light reflectance different from that of the printable surface on part of a surface opposite to the surface on which the conductive region is provided.

17. The stack-of-sheets package according to claim 11, wherein the conductive sheet is part of the package material.

18. The stack-of-sheets package according to claim 17, wherein the package material includes a notch in part of surroundings of the conductive sheet.

19. A stack-of-sheets package, comprising:

a stack of sheets obtained by stacking printing sheets, each of the printing sheets having a printable surface, a wireless tag being embedded in each of the printing sheets;

a conductive sheet that is disposed at an end portion of the stack of sheets in a stacking direction of the printing sheets and has a conductive region that overlaps with the wireless tag as viewed from the stacking direction; and a package material that packages the stack of sheets, wherein the conductive sheet is part of the package material, and the package material includes a notch in part of surroundings of the conductive sheet.

20. The stack-of-sheets package according to claim 1, wherein the conductive sheet is a non-folded rectangular sheet, and the package material is a folded sheet provided separately from the conductive sheet and enclosing the stack of sheets with the conductive sheet being stacked between the stack of sheets and the package material.

\* \* \* \* \*